(12) United States Patent
Bird et al.

(10) Patent No.: US 10,542,015 B2
(45) Date of Patent: Jan. 21, 2020

(54) COGNITIVE OFFENSE ANALYSIS USING CONTEXTUAL DATA AND KNOWLEDGE GRAPHS

(71) Applicant: International Business Machines Corporation, Armonk, NY (US)

(72) Inventors: William Alexander Bird, Fredericton (CA); Suzanne Carol Deffeyes, Weaverville, NC (US); Jiyong Jang, White Plains, NY (US); Dhilung Kirat, White Plains, NY (US); Youngja Park, Princeton, NJ (US); Josyula R. Rao, Briarcliff Manor, NY (US); Marc Philippe Stoecklin, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 254 days.

(21) Appl. No.: 15/236,575

(22) Filed: Aug. 15, 2016

(65) Prior Publication Data
US 2018/0048661 A1    Feb. 15, 2018

(51) Int. Cl.
*H04L 29/06*    (2006.01)

(52) U.S. Cl.
CPC ................. *H04L 63/1416* (2013.01)

(58) Field of Classification Search
CPC ............... H04L 63/1416; G06F 17/30477
(Continued)

(56) References Cited

U.S. PATENT DOCUMENTS 8,150,783 B2     4/2012  Gonsalves et al.
9,967,265 B1 *   5/2018  Peer ................... H04L 63/20
(Continued)

FOREIGN PATENT DOCUMENTS

WO    2008021585 A2    2/2008

OTHER PUBLICATIONS

Yen, T.-F., et al. "Beehive: large-scale log analysis for detecting suspicious activity in enterprise networks". Presentes at the Annual Computer Security Applications Conference, Dec. 2013.
(Continued)

*Primary Examiner* — Teshome Hailu
(74) *Attorney, Agent, or Firm* — Jeffrey S. LaBaw; David H. Judson

(57) ABSTRACT

An automated method for processing security events in association with a cybersecurity knowledge graph. The method begins upon receipt of information from a security system representing an offense. An initial offense context graph is built based in part on context data about the offense. The graph also activity nodes connected to a root node; at least one activity node includes an observable. The root node and its one or more activity nodes represent a context for the offense. The knowledge graph, and potentially other data sources, are then explored to further refine the initial graph to generate a refined graph that is then provided to an analyst for further review and analysis. Knowledge graph exploration involves locating the observables and their connections in the knowledge graph, determining that they are associated with known malicious entities, and then building subgraphs that are then merged into the initial graph.

21 Claims, 10 Drawing Sheets

(58) Field of Classification Search
USPC .......................................................... 726/22
See application file for complete search history.

(56) References Cited

U.S. PATENT DOCUMENTS

| | | | |
|---|---|---|---|
| 2006/0288415 A1* | 12/2006 | Wong | H04L 63/1425 726/24 |
| 2007/0192859 A1 | 8/2007 | Shahar et al. | |
| 2007/0226796 A1 | 9/2007 | Gilbert et al. | |
| 2009/0030756 A1 | 1/2009 | Riley et al. | |
| 2010/0325412 A1* | 12/2010 | Norrman | G06F 21/577 713/100 |
| 2014/0096256 A1* | 4/2014 | Clark | H04L 63/1433 726/25 |
| 2016/0065610 A1 | 3/2016 | Peteroy et al. | |
| 2016/0110543 A1* | 4/2016 | Park | G06F 21/563 726/22 |
| 2016/0219066 A1* | 7/2016 | Vasseur | H04L 63/1425 |
| 2017/0063910 A1* | 3/2017 | Muddu | H04L 63/1425 |

OTHER PUBLICATIONS

Oprea, A., et al. "Detection of Early-Stage Enterprise Infection by Mining Large-Scale Log Data" (pp. 45-56). Presented at the IEEE/IFIP International Conference on Dependable Systems and Networks, IEEE, Nov. 2014.

Invernizzi, L., et al. "Nazca: Detecting Malware Distribution in Large-Scale Networks." Presented at the Network and Distributed System Security Symposium, Reston, Feb. 2014.

Kwon, B.J., et al. "The Dropper Effect: Insights into Malware Distribution with Downloader Graph Analytics", (pp. 1118-1129). Presented at the 22nd ACM SIGSAC Conference, Oct. 2015.

Annacone, et al, "Developing an Ontology for Cyber Security Knowledge Graphs," Cyber and Information Security Research Conference, 2015.

* cited by examiner

*Findings from SIEM system's offense:*

1. [Dropper] Zip file containing a malicious JavaScript via Email spam.
MD5: el8e36bf1cf32fac9eeOO6931a7a912
AV signature: JS.Downloader
Filename: 9758W-TERREDOC-RS62937-15000.zip Malicious (obfuscated) JavaScript inside the Zip file. A user was tricked to open/execute the JS.
MD5: ad02452104dfd1eb2c91053e38332755
AV signature: JS/TrojanDownloader.Nemucod
Filename: NGM3450264505.js
QRadar event: ContextDemo_1_SEP.syslog 2. [Download URL] The JavaScript made connection to the below URL to download Locky malware.
URL: http://scorpena.com/765f46vb.exe
ip: 178.212.252.32
QRadar event: ContextDemo_2_Bluecoat.syslog 3. [Locky executable] Locky malware was downloaded and executed.
MD5: 0beb1124cbe82e4e1d3f743b5d711e5f
AV signature: Trojan.Gen
Filename: 765f46vb.exe
QRadar event: ContextDemo_3_SEP.syslog 4. [Post-infection) Locky made a web request for an RSA key.
URL: http://83.217.8.127/submit.php
QRador event: ContextDemo_4_Bluecoat.syslog

FIG. 7

COGNITIVE OFFENSE ANALYSIS USING CONTEXTUAL DATA AND KNOWLEDGE GRAPHS

BACKGROUND

Technical Field

This disclosure relates generally to cybersecurity offense analytics.

Background of the Related Art

Today's networks are larger and more complex than ever before, and protecting them against malicious activity is a never-ending task. Organizations seeking to safeguard their intellectual property, protect their customer identities, avoid business disruptions, and the like, need to do more than just monitor logs and network flow data; indeed, many organizations create millions, or even billions, of events per day, and distilling that data down to a short list of priority offenses can be daunting.

Known security products include Security Incident and Event Management (SIEM) solutions, which are built upon rule-based mechanisms to evaluate observed security events. SIEM systems and methods collect, normalize and correlate available network data. One such security intelligence product of this type is IBM® QRadar® SIEM, which provides a set of platform technologies that inspect network flow data to find and classify valid hosts and servers (assets) on the network, tracking the applications, protocols, services and ports they use. The product collects, stores and analyzes this data, and it performs real-time event correlation for use in threat detection and compliance reporting and auditing. Using this platform, billions of events and flows can therefore be reduced and prioritized into a handful of actionable offenses, according to their business impact. While SIEM-based approaches provide significant advantages, the rules are either hard coded or parameterized with a threat feed with concrete indicators of compromise (IoCs). Thus, typically these solutions are able to detect only known threats, but for unknown threats, e.g., detected by means of a behavior based rule, are unable to identify root cause and assist the security analyst. Moreover, these systems can present implementation challenges, as they often rely on manual curation of any semi-structured and unstructured threat feeds, i.e., natural language text, by means of security professionals reading threat advisories and extracting IoCs.

Security Operations Center (SOC) analysts who use such systems are confronted with a large number of offenses every day. The majority of their time is spent to understand and analyze these offenses, confirm their validity, find related information, and attempt to find appropriate actions to resolve them. Typically, SOC analysts attempt to find relevant cybersecurity intelligence reports and/or vulnerability reports for the target offenses from various data sources. To this end, mostly they use web search engines to query and manually browse threat and security intelligence Internet services. Given the widely-disparate information sources, an analyst often is faced with many, often conflicting, data sources and hypotheses to read and process to draw a conclusion.

Presently, there are no automated systems or tools to do search, filtering, and prioritization of hypotheses for security offenses. The subject matter of this disclosure addresses this need.

BRIEF SUMMARY

According to this disclosure, a method, apparatus and computer program product for cybersecurity offense analytics uses a cognitive methodology to automatically analyze and enrich an offense on behalf of a security analyst by collecting relevant contextual data.

In one embodiment, a method is described for processing security event data in association with a cybersecurity knowledge graph. The cybersecurity knowledge graph is derived from one or more data sources and includes a set of nodes, and a set of edges. The method is automated and begins upon receipt of information from a security system (e.g., a SIEM) representing an offense. Based on the offense type, context data about the offense is extracted, and an initial offense context graph is built. The initial offense context graph typically comprises a set of nodes, and a set of edges, with an edge representing a relationship between a pair of nodes in the set. At least one of the set of nodes in the offense context graph is a root node representing an entity (e.g., an offending entity, an offended entity, or some other possible role) that is determined as a cause of the offense. The initial offense context graph also includes one or more activity nodes connected to the root node either directly or through one or more other nodes of the set, wherein at least one activity node has associated therewith data representing an observable. The root node, its one or more activity nodes associated (directly or indirectly) therewith, and the observables) represent a context for the offense. According to the method, the knowledge graph and potentially other data sources are then examined to further refine the initial offense context graph.

In particular, the knowledge graph is explored by locating the observables (identified in the initial offense graph) in the knowledge graph. Based on the located observables and their connections being associated with one or more known malicious entities as represented in the knowledge graph, one or more subgraphs of the knowledge graph are then generated. A subgraph typically has a hypothesis (about the offense) associated therewith. Using a hypothesis, the method then queries the security system (or other data source) to attempt to obtain one or more additional observables supporting the hypothesis. Then, a refined offense context graph is created by merging the initial offense context graph, the one or more sub-graphs, and the additional observables. The resulting refined offense context graph is then provided (e.g., to a SOC analyst) for further analysis.

An offense context graph that has been refined in this manner, namely, by incorporating one or more subgraphs derived from the knowledge graph as well as additional observables mined from examining the subgraph hypotheses, provides for a refined graph that reveals potential causal relationships more readily, or otherwise provides information that reveals which parts of the graph might best be prioritized for further analysis. The approach herein thus greatly simplifies the further analysis and corrective tasks that must then be undertaken to address the root cause of the offense.

According to a second aspect of this disclosure, an apparatus for processing security event data is described. The apparatus comprises a set of one or more hardware processors, and computer memory holding computer program instructions executed by the hardware processors to perform a set of operations such as described above.

According to a third aspect of this disclosure, a computer program product in a non-transitory computer readable medium for use in a data processing system for processing security event data is described. The computer program product holds computer program instructions executed in the data processing system and operative to perform operations such as described above.

The foregoing has outlined some of the more pertinent features of the subject matter. These features should be construed to be merely illustrative. Many other beneficial results can be attained by applying the disclosed subject matter in a different manner or by modifying the subject matter as will be described.

BRIEF DESCRIPTION OF THE DRAWINGS

For a more complete understanding of the present invention and the advantages thereof, reference is now made to the following descriptions taken in conjunction with the accompanying drawings, in which:

FIG. 7 depicts a representative example scenario and, in particular, a partial set of findings that are output from the SIEM about a potential offense;

DETAILED DESCRIPTION OF AN
ILLUSTRATIVE EMBODIMENT

Figure 1:
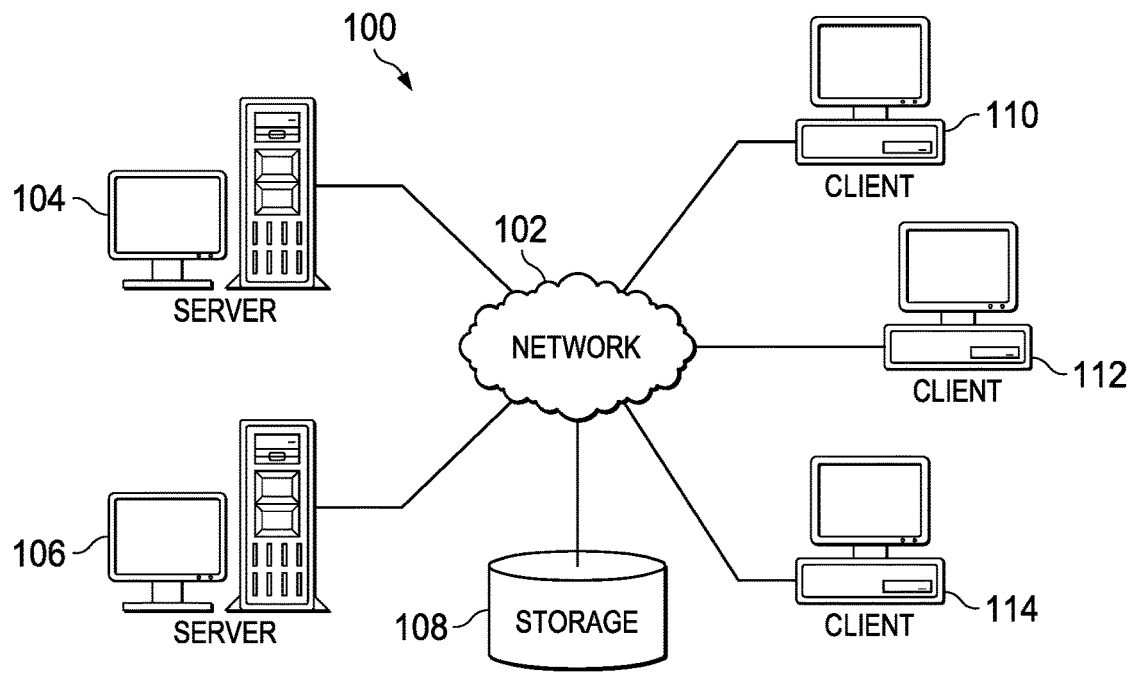
FIG. 1 depicts an exemplary block diagram of a distributed data processing environment in which exemplary aspects of the illustrative embodiments may be implemented.
Figure 2:
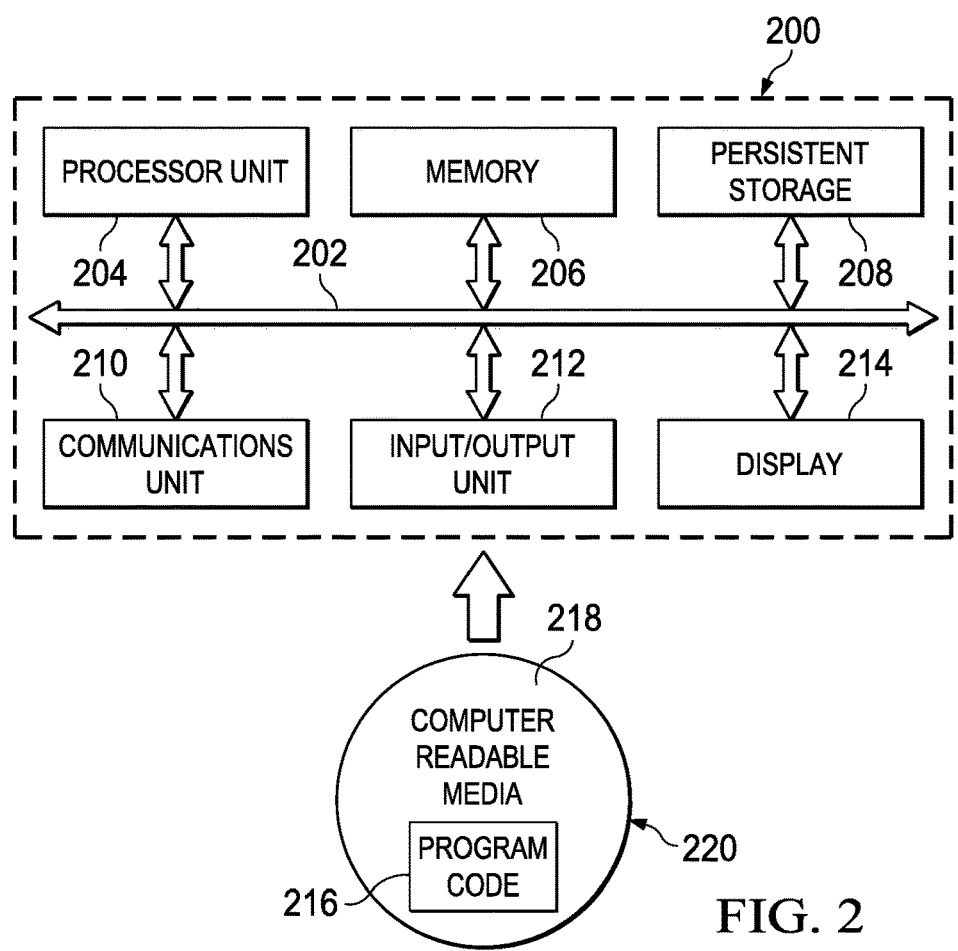
FIG. 2 is an exemplary block diagram of a data processing system in which exemplary aspects of the illustrative embodiments may be implemented.

With reference now to the drawings and in particular with reference to FIGS. 1-2, exemplary diagrams of data processing environments are provided in which illustrative embodiments of the disclosure may be implemented. It should be appreciated that FIGS. 1-2 are only exemplary and are not intended to assert or imply any limitation with regard to the environments in which aspects or embodiments of the disclosed subject matter may be implemented. Many modifications to the depicted environments may be made without departing from the spirit and scope of the present invention.

With reference now to the drawings, FIG. 1 depicts a pictorial representation of an exemplary distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the disclosed subject matter, and therefore, the particular elements shown in FIG. 1 should not be considered limiting with regard to the environments in which the illustrative embodiments of the present invention may be implemented.

With reference now to FIG. 2, a block diagram of an exemplary data processing system is shown in which aspects of the illustrative embodiments may be implemented. Data processing system 200 is an example of a computer, such as client 110 in FIG. 1, in which computer usable code or instructions implementing the processes for illustrative embodiments of the disclosure may be located.

With reference now to FIG. 2, a block diagram of a data processing system is shown in which illustrative embodiments may be implemented. Data processing system 200 is an example of a computer, such as server 104 or client 110 in FIG. 1, in which computer-usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor (SMP) system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer-usable program code, or computer-readable program code that may be read and executed by a processor in processor unit 204. The program code in the different embodiments may be embodied on different physical or tangible computer-readable media, such as memory 206 or persistent storage 208.

Program code 216 is located in a functional form on computer-readable media 218 that is selectively removable and may be loaded onto or transferred to data processing system 200 for execution by processor unit 204. Program code 216 and computer-readable media 218 form computer program product 220 in these examples. In one example, computer-readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer-readable media 218 also may take the form of a persistent storage, such as a hard drive, a thumb drive, or a flash memory that is connected to data processing system 200. The tangible form of computer-readable media 218 is also referred to as computer-recordable storage media. In some instances, computer-recordable media 218 may not be removable.

Alternatively, program code 216 may be transferred to data processing system 200 from computer-readable media 218 through a communications link to communications unit 210 and/or through a connection to input/output unit 212. The communications link and/or the connection may be physical or wireless in the illustrative examples. The computer-readable media also may take the form of non-tangible media, such as communications links or wireless transmissions containing the program code. The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. As one example, a storage device in data processing system 200 is any hardware apparatus that may store data. Memory 206, persistent storage 208, and computer-readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Computer program code for carrying out operations of the present invention may be written in any combination of one or more programming languages, including an object-oriented programming language such as Java™, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the disclosed subject matter.

As will be seen, the techniques described herein may operate in conjunction within the standard client-server paradigm such as illustrated in FIG. 1 in which client machines communicate with an Internet-accessible Web-based portal executing on a set of one or more machines. End users operate Internet-connectable devices (e.g., desktop computers, notebook computers, Internet-enabled mobile devices, or the like) that are capable of accessing and interacting with the portal. Typically, each client or server machine is a data processing system such as illustrated in FIG. 2 comprising hardware and software, and these entities communicate with one another over a network, such as the Internet, an intranet, an extranet, a private network, or any other communications medium or link. A data processing system typically includes one or more processors, an operating system, one or more applications, and one or more utilities. The applications on the data processing system provide native support for Web services including, without limitation, support for HTTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP and XML is available from Internet Engineering Task Force (IETF). Familiarity with these standards is presumed.

Security Intelligence Platform with Incident Forensics

Figure 3:
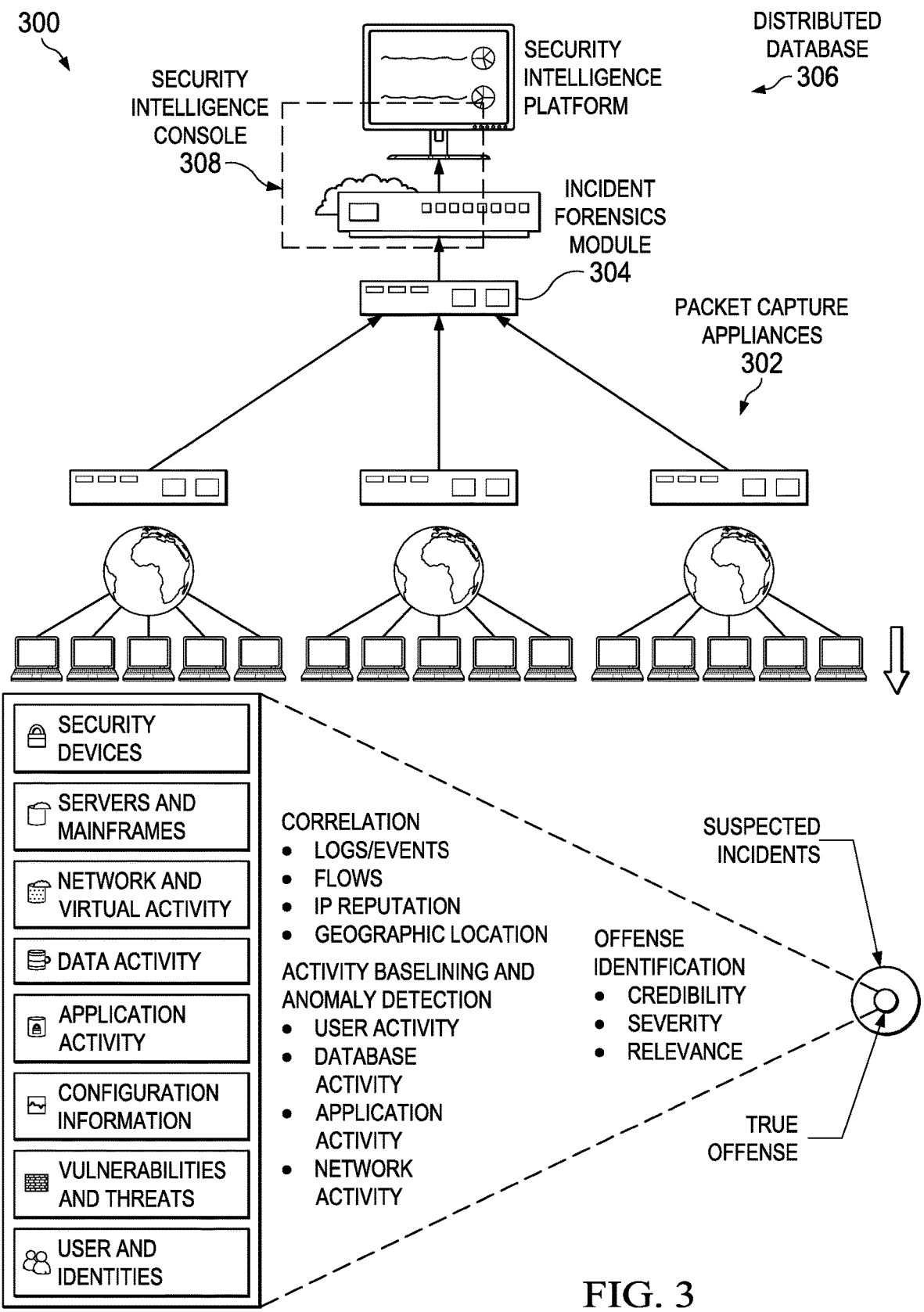
FIG. 3 illustrates a security intelligence platform in which the techniques of this disclosure may be practiced.

A representative security intelligence platform in which the techniques of this disclosure may be practiced is illustrated in FIG. 3. Generally, the platform provides search-driven data exploration, session reconstruction, and forensics intelligence to assist security incident investigations. In pertinent part, the platform 300 comprises a set of packet capture appliances 302, an incident forensics module appliance 304, a distributed database 306, and a security intelligence console 308. The packet capture and module appliances are configured as network appliances, or they may be configured as virtual appliances. The packet capture appliances 302 are operative to capture packets off the network (using known packet capture (pcap) application programming interfaces (APIs) or other known techniques), and to provide such data (e.g., real-time log event and network flow) to the distributed database 306, where the data is stored and available for analysis by the forensics module 304 and the security intelligence console 308. A packet capture appliance operates in a session-oriented manner, capturing all packets in a flow, and indexing metadata and payloads to enable fast search-driven data exploration. The database 306 provides a forensics repository, which distributed and heterogeneous data sets comprising the information collected by the packet capture appliances. The console 308 provides a web- or cloud-accessible user interface (UI) that exposes a "Forensics" dashboard tab to facilitate an incident investigation workflow by an investigator. Using the dashboard, an investigator selects a security incident. The incident forensics module 304 retrieves all the packets (including metadata, payloads, etc.) for a selected security incident and reconstructs the session for analysis. A representative commercial product that implements an incident investigation workflow of this type is IBM® Security QRadar® Incident Forensics V7.2.3 (or higher). Using this platform, an investigator searches across the distributed and heterogeneous data sets stored in the database, and receives a unified search results list. The search results may be merged in a grid, and they can be visualized in a "digital impression" tool so that the user can explore relationships between identities.

In particular, a typical incident forensics investigation to extract relevant data from network traffic and documents in the forensic repository is now described. According to this approach, the platform enables a simple, high-level approach of searching and bookmarking many records at first, and then enables the investigator to focus on the bookmarked records to identify a final set of records. In a typical workflow, an investigator determines which material is relevant. He or she then uses that material to prove a hypothesis or "case" to develop new leads that can be followed up by using other methods in an existing case. Typically, the investigator focuses his or her investigation through course-grained actions at first, and then proceeds to fine-tune those findings into a relevant final result set. The bottom portion of FIG. 3 illustrates this basic workflow. Visualization and analysis tools in the platform may then be used to manually and automatically assess the results for relevance. The relevant records can be printed, exported, or submitted processing.

As noted above, the platform console provides a user interface to facilitate this workflow. Thus, for example, the platform provides a search results page as a default page on an interface display tab. Investigators use the search results to search for and access documents. The investigator can use other tools to further the investigation. One of these tools is a digital impression tool. A digital impression is a compiled set of associations and relationships that identify an identity trail. Digital impressions reconstruct network relationships to help reveal the identity of an attacking entity, how it communicates, and what it communicates with. Known entities or persons that are found in the network traffic and documents are automatically tagged. The forensics incident module 304 is operative to correlate tagged identifiers that interacted with each other to produce a digital impression. The collection relationships in a digital impression report represent a continuously-collected electronic presence that is associated with an attacker, or a network-related entity, or any digital impression metadata term. Using the tool, investigators can click any tagged digital impression identifier that is associated with a document. The resulting digital impression report is then listed in tabular format and is organized by identifier type.

Generalizing, a digital impression reconstructs network relationships to help the investigator identify an attacking entity and other entities that it communicates with. A security intelligence platform includes a forensics incident module that is operative to correlate tagged identifiers that interacted with each other to produce a digital impression. The collection relationships in a digital impression report represent a continuously-collected electronic presence that is associated with an attacker, or a network-related entity, or any digital impression metadata term. Using the tool, investigators can click any tagged digital impression identifier that is associated with a document. The resulting digital impression report is then listed in tabular format and is organized by identifier type.

Typically, an appliance for use in the above-described system is implemented is implemented as a network-connected, non-display device. For example, appliances built purposely for performing traditional middleware service oriented architecture (SOA) functions are prevalent across certain computer environments. SOA middleware appliances may simplify, help secure or accelerate XML and Web services deployments while extending an existing SOA infrastructure across an enterprise. The utilization of middleware-purposed hardware and a lightweight middleware stack can address the performance burden experienced by conventional software solutions. In addition, the appliance form-factor provides a secure, consumable packaging for implementing middleware SOA functions. One particular advantage that these types of devices provide is to offload processing from back-end systems. A network appliance of this type typically is a rack-mounted device. The device includes physical security that enables the appliance to serve as a secure vault for sensitive information. Typically, the appliance is manufactured, pre-loaded with software, and then deployed within or in association with an enterprise or other network operating environment; alternatively, the box may be positioned locally and then provisioned with standard or customized middleware virtual images that can be securely deployed and managed, e.g., within a private or an on premise cloud computing environment. The appliance may include hardware and firmware cryptographic support, possibly to encrypt data on hard disk. No users, including administrative users, can access any data on physical disk. In particular, preferably the operating system (e.g., Linux) locks down the root account and does not provide a command shell, and the user does not have file system access. Typically, the appliance does not include a display device, a CD or other optical drive, or any USB, Firewire or other ports to enable devices to be connected thereto. It is designed to be a sealed and secure environment with limited accessibility and then only be authenticated and authorized individuals.

An appliance of this type can facilitate Security Information Event Management (SIEM). For example, and as noted above, IBM® Security QRadar® SIEM is an enterprise solution that includes packet data capture appliances that may be configured as appliances of this type. Such a device is operative, for example, to capture real-time Layer 4 network flow data from which Layer 7 application payloads may then be analyzed, e.g., using deep packet inspection and other technologies. It provides situational awareness and compliance support using a combination of flow-based network knowledge, security event correlation, and asset-based vulnerability assessment. In a basic QRadar SIEM installation, the system such as shown in FIG. 3 is configured to collect event and flow data, and generate reports. As noted, a user (e.g., an SOC analyst) can investigate offenses to determine the root cause of a network issue.

Generalizing, Security Information and Event Management (SIEM) tools provide a range of services for analyzing, managing, monitoring, and reporting on IT security events and vulnerabilities. Such services typically include collection of events regarding monitored accesses and unexpected occurrences across the data network, and analyzing them in a correlative context to determine their contribution to profiled higher-order security events. They may also include analysis of firewall configurations, network topology and connection visualization tools for viewing current and potential network traffic patterns, correlation of asset vulnerabilities with network configuration and traffic to identify active attack paths and high-risk assets, and support of policy compliance monitoring of network traffic, topology and vulnerability exposures. Some SIEM tools have the ability to build up a topology of managed network devices such as routers, firewalls, and switches based on a transformational analysis of device configurations processed through a common network information model. The result is a locational organization which can be used for simulations of security threats, operational analyses of firewall filters, and other applications. The primary device criteria, however, are entirely network- and network-configuration based. While there are a number of ways to launch a discovery capability for managed assets/systems, and while containment in the user interface is semi-automatically managed (that is, an approach through the user interface that allows for semi-automated, human-input-based placements with the topology, and its display and formatting, being data-driven based upon the discovery of both initial configurations and changes/deletions in the underlying network), nothing is provided in terms of placement analytics that produce fully-automated placement analyses and suggestions.

Cognitive Offense Analysis Using Contextual Data and Knowledge Graphs

With the above as background, the techniques of this disclosure are now described.

The basic approach of this disclosure involves processing security event data in association with a cybersecurity knowledge graph ("KG"). The cybersecurity knowledge graph is derived one or more data sources and includes a set of nodes, and a set of edges. The method preferably is automated and begins upon receipt of information from a security system (e.g., a SIEM) representing an offense. Based on the offense type, context data about the offense is extracted, and an initial offense context graph is built. The initial offense context graph typically comprises a set of nodes, and a set of edges, with an edge representing a relationship between a pair of nodes in the set. At least one of the set of nodes in the offense context graph is a root node representing an offending entity that is determined as a cause of the offense. The initial offense context graph also includes one or more activity nodes connected to the root node either directly or through one or more other nodes of the set, wherein at least one activity node has associated therewith data representing an observable. The root node and its one or more activity nodes associated therewith (and the observables) represent a context for the offense. According to the method, the knowledge graph and potentially other data sources are then examined to further refine the initial offense context graph.

In particular, preferably the knowledge graph is explored by locating the observables (identified in the initial offense graph) in the knowledge graph. Based on the located observables and their connections being associated with one or more known malicious entities as represented in the knowledge graph, one or more subgraphs of the knowledge graph are then generated. A subgraph typically has a hypothesis (about the offense) associated therewith. Using a hypothesis, the security system (or other data source) is then queried to attempt to obtain one or more additional observables (i.e. evidence) supporting the hypothesis. Then, a refined offense context graph is created, preferably by merging the initial offense context graph, the one or more sub-graphs derived from the knowledge graph exploration, and the additional observables mined from the one or more hypotheses. The resulting refined offense context graph is then provided (e.g., to a SOC analyst) for further analysis.

An offense context graph that has been refined in this manner, namely, by incorporating one or more subgraphs derived from the knowledge graph as well as additional observables mined from examining the subgraph hypotheses, provides for a refined graph that reveals potential causal relationships more readily, or otherwise provides information that reveals which parts of the graph might best be prioritized for further analysis. The approach herein thus greatly simplifies the further analysis and corrective tasks that must then be undertaken to address the root cause of the offense.

Figure 4:
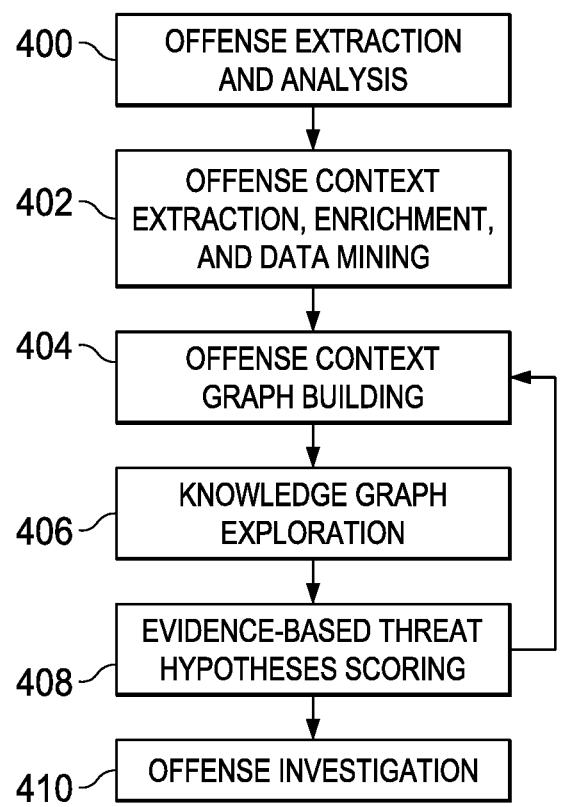
FIG. 4 depicts a high level process flow of the cognitive analysis technique of this disclosure.

With reference now to FIG. 4, a high level process flow of the technique of this disclosure is provided The routine begins at step 400 with offense extraction and analysis. In this step, an offense is extracted from a SIEM system, such as IBM QRadar, for deep investigation. Typically, a detected offense may include many different entities, such as offense types, fired rules, user names, and involved indicators of compromise.

At step 402, the process continues with offense context extraction, enrichment and data mining. Here, offense context is extracted and enriched based on various information or factors such as, without limitation, time, an offense type, and a direction. This operation typically involves data mining around the offense to find potentially related events. The process then continues at step 404 to build an offense context graph, preferably with the offending entity as the center node and contextual information gradually connected to the center node and its children. Examples of contextual information can be represented by activity nodes in the graph. Typically, an activity comprises one or more observables, which are then connected to the respective activity, or directly to the center node.

The process then continues at step 406. In particular, at this step a knowledge graph is explored, preferably using a set of observables extracted from the offense context graph. This exploration step identifies related and relevant pieces of information or entities available from the knowledge graph. A primary goal in this operation is to find out how strongly the input observables are related to malicious entities in the knowledge graph. If the event related entities are strong malicious indicators, a hypothesis (represented by a subgraph in the knowledge graph) is generated. The process then continues at step 408. At this step, the resulting subgraph (generated in step 406) is mapped into the original offense context graph and scored. To reinforce the hypothesis (represented by the subgraph), additional evidence may be obtained (and built into the offense context graph) by querying local SIEM data for the presence of activities that are related to the hypothesis that is returned by the KG exploration in step 406. Additional findings as part of the hypothesis scoring may also be used to extend the offense context graph further and/or to trigger new knowledge graph explorations. Thus, step 408 represents an evidence-based scoring of the threat hypothesis.

The process then continues at step 410 with an offense investigation. At this point, the offense hypothesis includes the original offense IOCs (indicators of compromise), knowledge graph enrichment, evidence, and scores. The extended offense context graph is then provided to the SOC analyst (user) for offense investigation. The SOC user reviews the hypothesis that has been weighted in the manner described, and can then choose the right hypothesis that explains the given offense. There may be multiple hypotheses.

If additional or further exploration and more evidence are needed to make a decision, the SOC user can elect to nodes or edges in the offense context graph and repeat steps 406 and 408 as needed. This iteration is depicted in the drawing. This completes the high level process flow.

Figure 5:
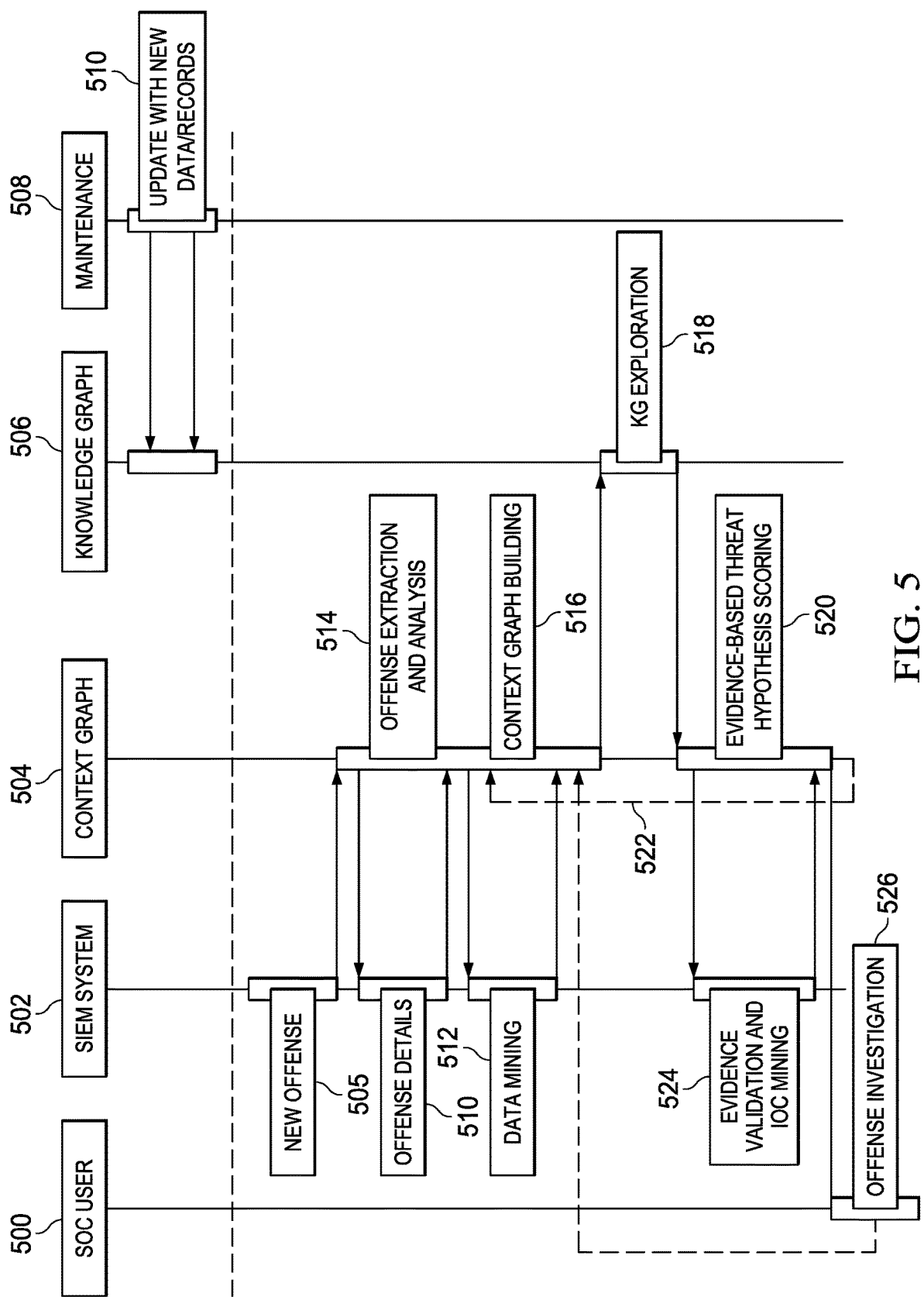
FIG. 5 depicts the cognitive analysis technique in additional detail.

FIG. 5 depicts a modeling diagram showing the various entities involved in the technique and their interactions. As depicted, these entities include the SOC user 500, the SIEM system 502, the (offense) context graph 504, a knowledge graph 506, and a maintenance entity 508. Viewing the interactions from top to bottom, the knowledge graph 506 may be updated with new data/records 510 periodically; this operation is shown as an off-line operation (above the dotted line). The remainder of the figure depicts the process flow referenced above. Thus, the new offense 505 is identified by the SIEM system 502 and used together with the offense details 510 and data mining 512 to generate the context graph 504 via the offense extraction and analysis 514 and context graph building 516 operations. Once built, the knowledge graph 506 is explored 518 to identify one or more subgraphs. The evidence-based threat hypothesis scoring uses the subgraphs at operation 520, and the process may iterate (operation 522) as previously described. After evidence validation and IOC mining 524, the offense investigation 526 is then carried out, typically by the SOC user 500.

Figure 6:
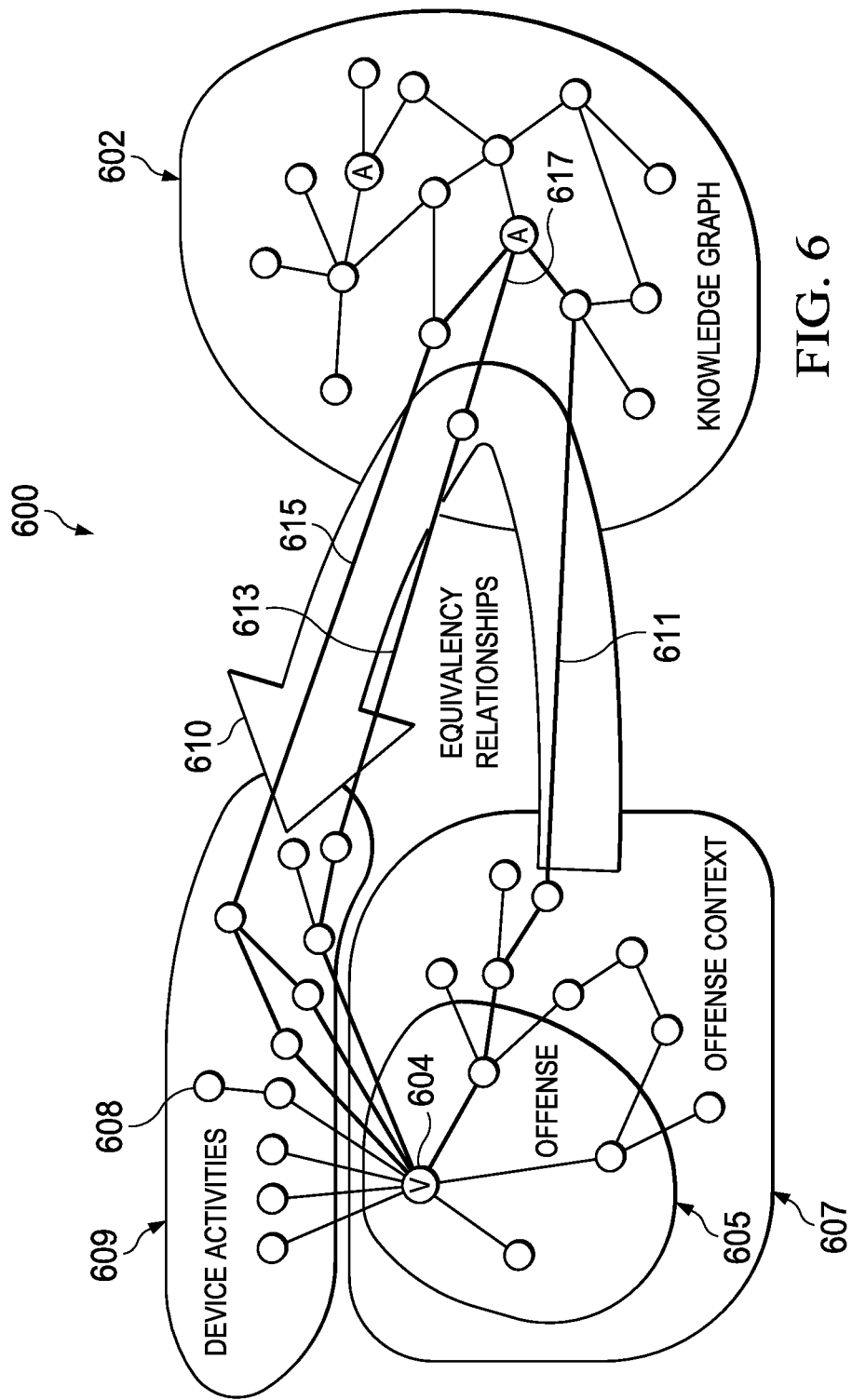
FIG. 6 depicts how an offense context graph is augmented using a security knowledge graph according to this disclosure.

FIG. 6 depicts the offense context graph 600 augmented by the knowledge graph 602. In general, the offense context graph 600 depicts local kinetics, e.g., events and intelligence related to an offense, e.g., SIEM offense data, log events and flows, and such information preferably is augmented from the information derived from the knowledge graph 602. The knowledge graph is global in nature and scope, as it preferably depicts external cyber security and threat intelligence, cyber security concepts, and the like. Typically, the knowledge graph is informed by combining multiple structured and unstructured data sources. As shown, the offense context graph is centered around a root node 604 that has child nodes 606 within the "offense" 605. The "offense context" 607 includes still other nodes of relevance. There may also be a set of device activities 609 that include relevant device nodes 608. As depicted by the arrow 610, augmenting the context graph 600 using the knowledge graph 602 examines whether there is any path (such as one or more of paths 611, 613 or 615) from a node in the set of offense context nodes 607 to a node in the set of device activities 609 that passes through one or more nodes of the knowledge graph 602 (to which a threat activity is attached)? In the example shown, there is one or more such paths (611, 613 and 615), and the relevant subgraph 617 in the knowledge graph thus is captured and used to augment the offense context graph.

Thus, in the approach, details of an offense are extracted from a SIEM system, such as QRadar. The details typically include offense types, rules, categories, source and destination IP addresses, and user names. For example, an offense may be a malware category offense that indicates that malicious software is detected on a machine. Accordingly, activities of the machine around the offense need to be examined to determine infection vectors and potential data leakage. Of course, the nature of the activities that will need to be investigated will depend on the nature of the offense.

According to a further aspect of the approach herein, offense context related to an identified offense is then extracted and enriched depending on various factors, such as time, an offense type, and a direction. For example, if an offense type is a source IP, system and network activities of the same source IP (which may or may not be captured at other offenses) may then be collected. This collected context depicts potential casual relationships among events, and this information then provides a basis for investigation of provenance and consequences of an offense, e.g., Markov modeling to learn their dependencies. Of course, the nature of the offense context extraction and enrichment also depends on the nature of the offense.

From the contextual data extracted (as described above), an initial offense "context graph" 600 in FIG. 6 is built, preferably depending on offense types, such that a main offense source becomes a root 604 of an offense context graph, and offense details are then linked together around the root node. As noted above, the initial context graph preferably is then enriched and, in particular, by correlating local context, to further identify potential causal relationships among events. This helps analysts perform deep, more fine-grained investigation of provenance and consequences of the offense.

In a preferred embodiment, provenance context preferably is extracted by identifying other offenses wherein the offense source is a target, e.g., an exploit target. Similarly, consequence context is extracted, preferably by finding other offenses wherein the offense source also is a source, e.g., a stepping stone. Similarly, consequence context is extracted by finding other offenses. Thus, this graph typically contains the offending entity (e.g., computer system, user, etc.) as the center (root) node of the graph, and contextual information is gradually connected to the node and its children. The result is the offense context 607 in FIG. 6. Examples of contextual information will depend on the nature of the offense; such information can be represented by activity nodes that include, without limitation, network activity, user activity, system activity, application activity, and so forth. Preferably, an activity comprises one or more observables, which are then connected to the respective activity nodes or directly to the center node. Further, the context graph can be extended with additional nodes representing information that does not directly relate to the original offense. For example, and by means of data mining (e.g., behavior-based anomaly detection, sequence mining, rule-based data extraction, and the like) of security-related events in temporal vicinity to the offense, additional activities of interest can be extracted and added to the context graph. This operation is represented in the graph by device activities 606.

Thus, in the approach as outlined so far, details of an offense are extracted from a SIEM system. The details include (but are not limited to) offense types, rules, categories, source and destination IPs, and user names. An initial offense context graph is built depending on offense types, such that the main offense source becomes the root of an offense context graph and offense details are linked together around the root node. The initial context graph is then enriched by correlating local context to further identify potential casual relationships among events, which helps analysts perform deep investigation of provenance and consequences of the offense. Provenance context is extracted by identifying other offenses where the offense source is a target, e.g., an exploit target. Similarly, consequence context is extracted by finding other offenses where the offense target is a source, e.g., a stepping stone. The enriched (and potentially dense) offense context graph is then pruned to highlight critical offense context for the SOC analyst's benefit. Typically, pruning is applied based on several metrics, such as weight, relevance, and time. For example, it may be desirable to assign weight to each event detail based on offense rules and categories to thereby indicate key features contributing to an offense.

Once the initial offense context graph is built, preferably that context graph is further enriched, validated and/or augmented based on information derived from a cybersecurity knowledge graph (KG) 602, which preferably is a source of domain knowledge. The knowledge graph, like the initial offense context graph, comprises nodes and edges. The cybersecurity knowledge graph can be constructed in several ways. In one embodiment, one or more domain experts build a KG manually. In another embodiment, a KG 602 is built automatically or semi-automatically, e.g., from structured and unstructured data sources. As noted above, the context extraction and analysis processes provide a list of observables related to the given offense. According to this operation, the observables preferably are then enriched using the in-depth domain knowledge in the KG. This enrichment (or knowledge graph exploration) is now described.

In particular, this knowledge graph (KG) enrichment operation can be done in several different ways. In one approach, enrichment involves building sub-graphs related to the observables. To this end, the system locates the observables in the KG and discovers the connections among them. This discovery may yield one or more subgraphs (such as 617 in FIG. 6) showing the relationships of the given observables with other related security objects such as observables and threats. These subgraphs can provide a broader view on the given offense.

In another enrichment scenario, a SOC analyst can perform the query knowledge graph (KG) exploration step receives a set of observables, such as IP, URL, and files hashes, extracted from the SIEM offense. This exploration step seeks to identify all related and relevant pieces of information or entities available in the knowledge graph. The main goal is to find out how strongly the input observables are related to malicious entities in the knowledge graph. Some of the related entities can be strong malicious indicators, and thus a hypothesis about the offense can be generated. The related malicious entities might be strongly related among themselves, which also creates a hypothesis. Generalizing, an output of this step is a set of one or more hypotheses, which are consumed during the evidence-based threat hypothesis scoring operation where they are evaluated against local SIEM data. Preferably, and as noted above, the extraction of related entities is performed by traversing the knowledge graph, preferably starting from the input observables and extracting the subgraph. In general, unconstrained subgraph extraction may result in a very large and noise graph. Thus, and as will be further described below, preferably one or more traversal algorithms that focus on finding different types of related information by exploring the graph and pruning less relevant entities from the result may be deployed. One or more of these pruning algorithms may be run serially, in parallel, or otherwise. In addition, where possible coefficients of the graph entities are precomputed to enhance the efficiency of the graph traversal.

The following describes additional details of the evidence-based threat hypothesis scoring. Preferably, the knowledge graph exploration step returns a subgraph of observables, along with one or more annotations associated with the hypotheses. This subgraph preferably is then mapped into the original context graph. To reinforce the hypotheses, it may be desirable to build further relevant evidence, e.g., by querying local SIEM data for the presence of activities that are related to the hypotheses returned by the knowledge graph exploration. These activities may not have been flagged before by a simple rule-based offense monitor. This operation thus builds a merged graph that includes input from three sources, the original context graph, the knowledge graph exploration subgraph, and the additional observables queried for building the evidence for the hypotheses.

As also described, the final operation typically is offense investigation. Based on the prior operations described, the offense hypotheses now include the original offense IOCs, knowledge graph enrichment and supporting evidences, and their scores. This extended graph then is provided to an SOC analyst for an offense investigation. The SOC analyst reviews the weighted hypotheses and chooses the right hypothesis that explains the given offense. The selection itself may be automated, e.g., via machine learning. If further exploration and more evidence are needed to make a decision, the SOC can choose the nodes and/or edges of interest in the hypothesis graphs, and then repeat the above-described steps of knowledge graph exploration and evidence-based threat hypotheses scoring. During the hypothesis review process, the SOC may learn new facts and insights about the offense and, thus, add additional queries (e.g. observables or relationship) in a next iteration. The SOC analyst thus can use this iterative knowledge enrichment, evidence generation and hypothesis scoring to gain a deep understanding of the offense and actionable insights that may then be acted upon.

Thus, the basic notion of this approach is to use an autonomic mechanism to extract what is known about an offense (or attack), reason about the offense based on generalized knowledge (as represented by the knowledge graph), and thereby arrive at a most probable diagnosis about the offense and how to address it.

Figure 8:
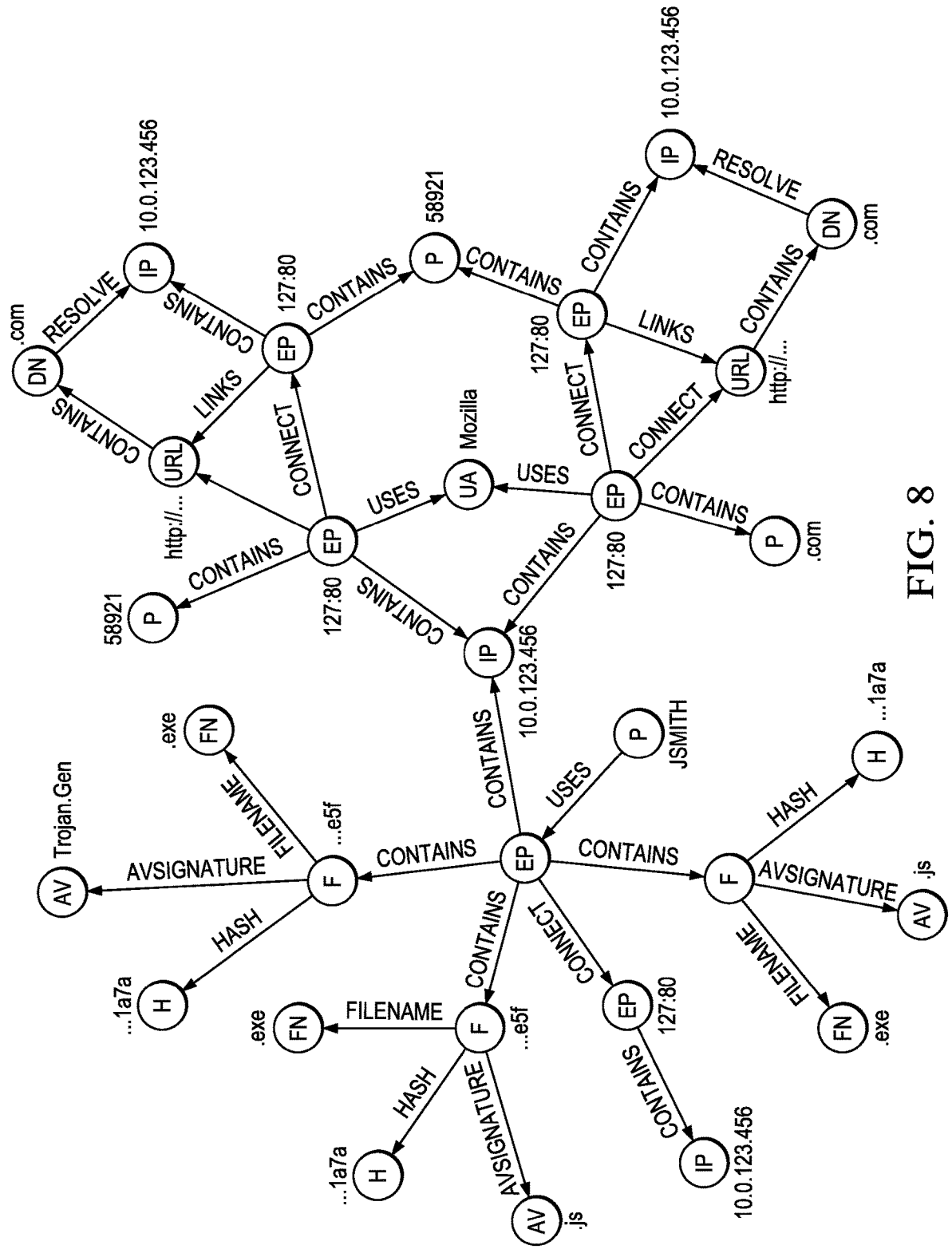
FIG. 8 depicts a representative offense context graph that is generated from the findings.
Figure 9:
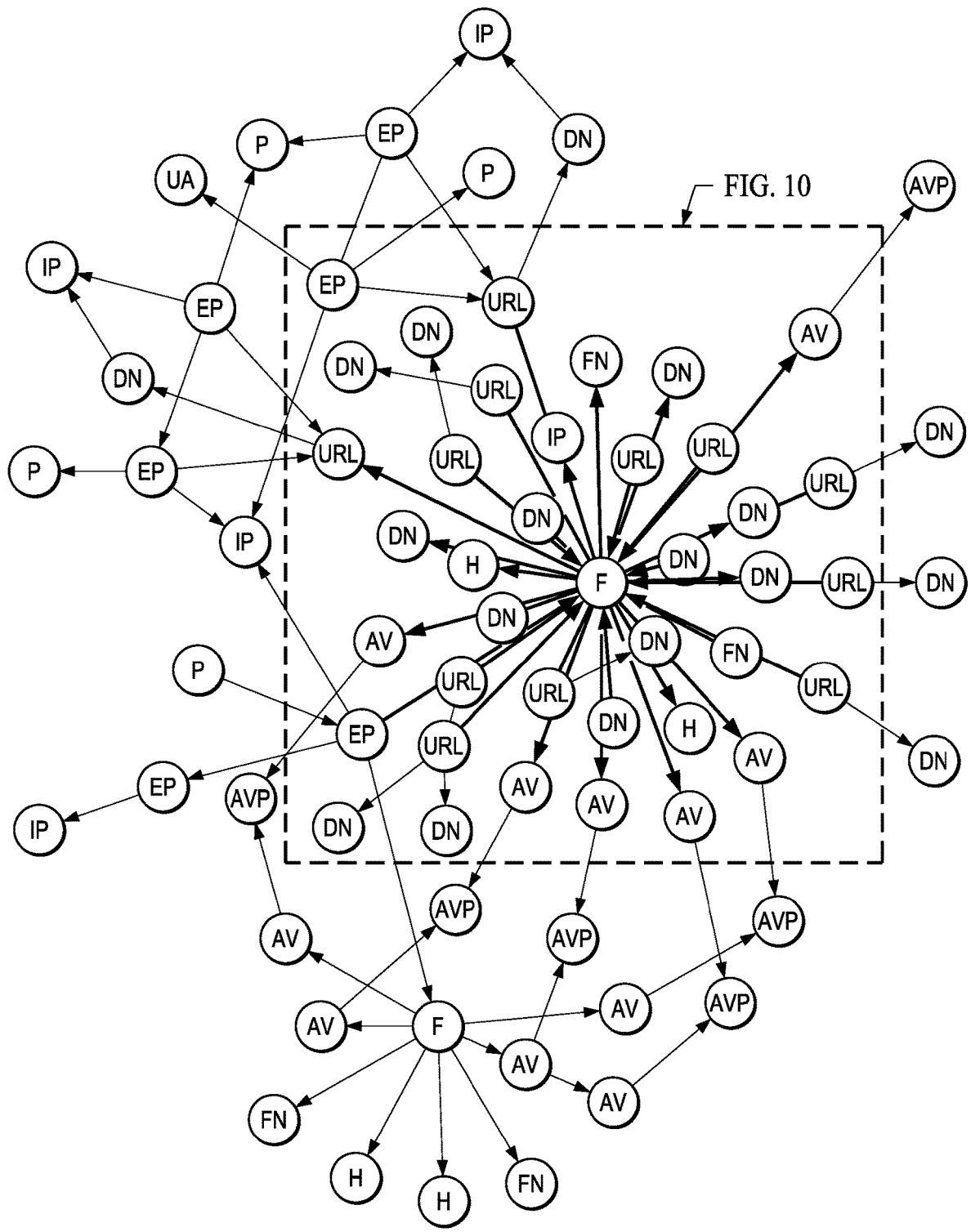
FIG. 9 depicts a representative offense graph after enrichment with nodes and relationships from the security knowledge graph.
Figure 10:
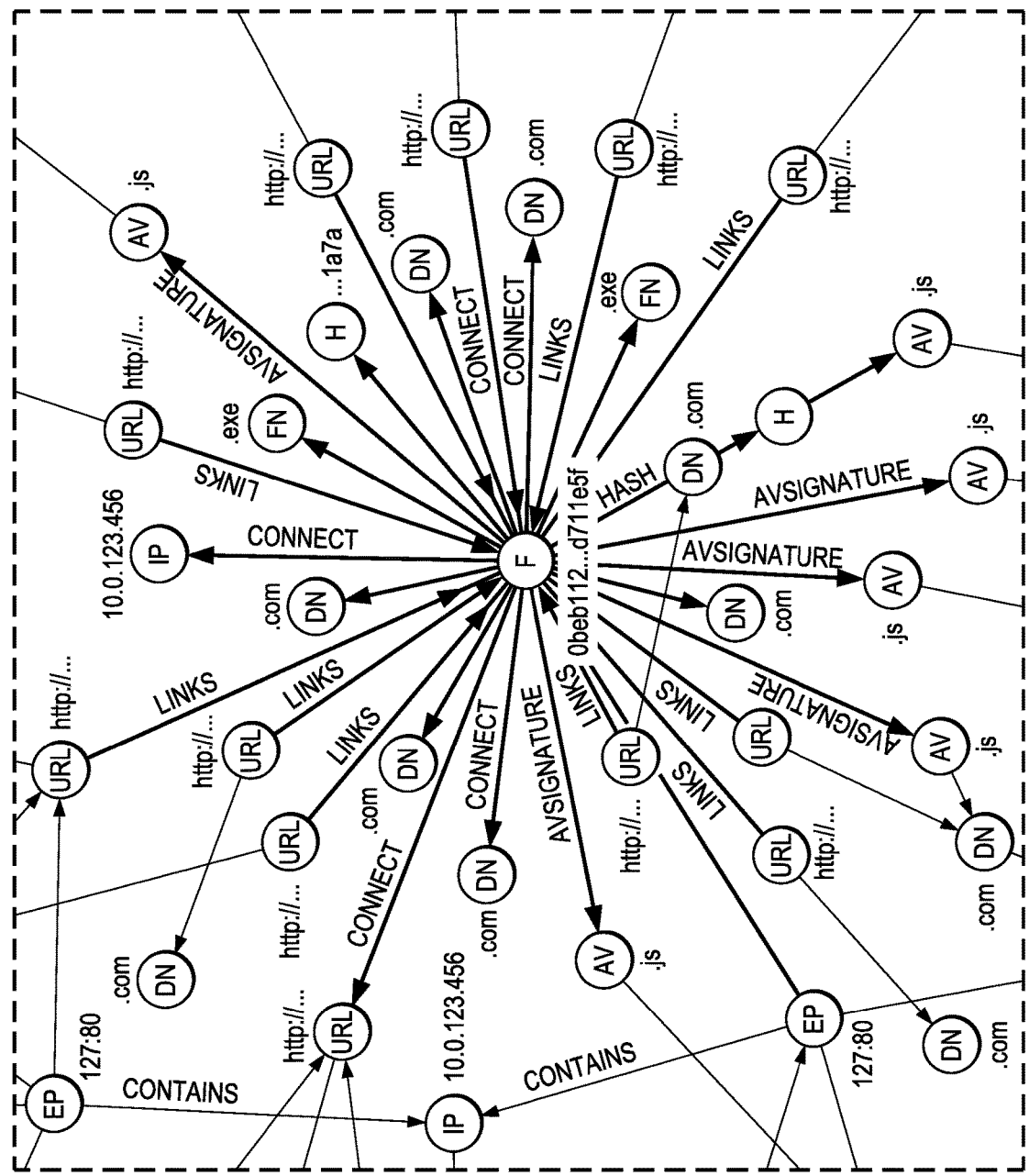
FIG. 10 depicts a close-up view of the enriched offense graph.
Figure 11:
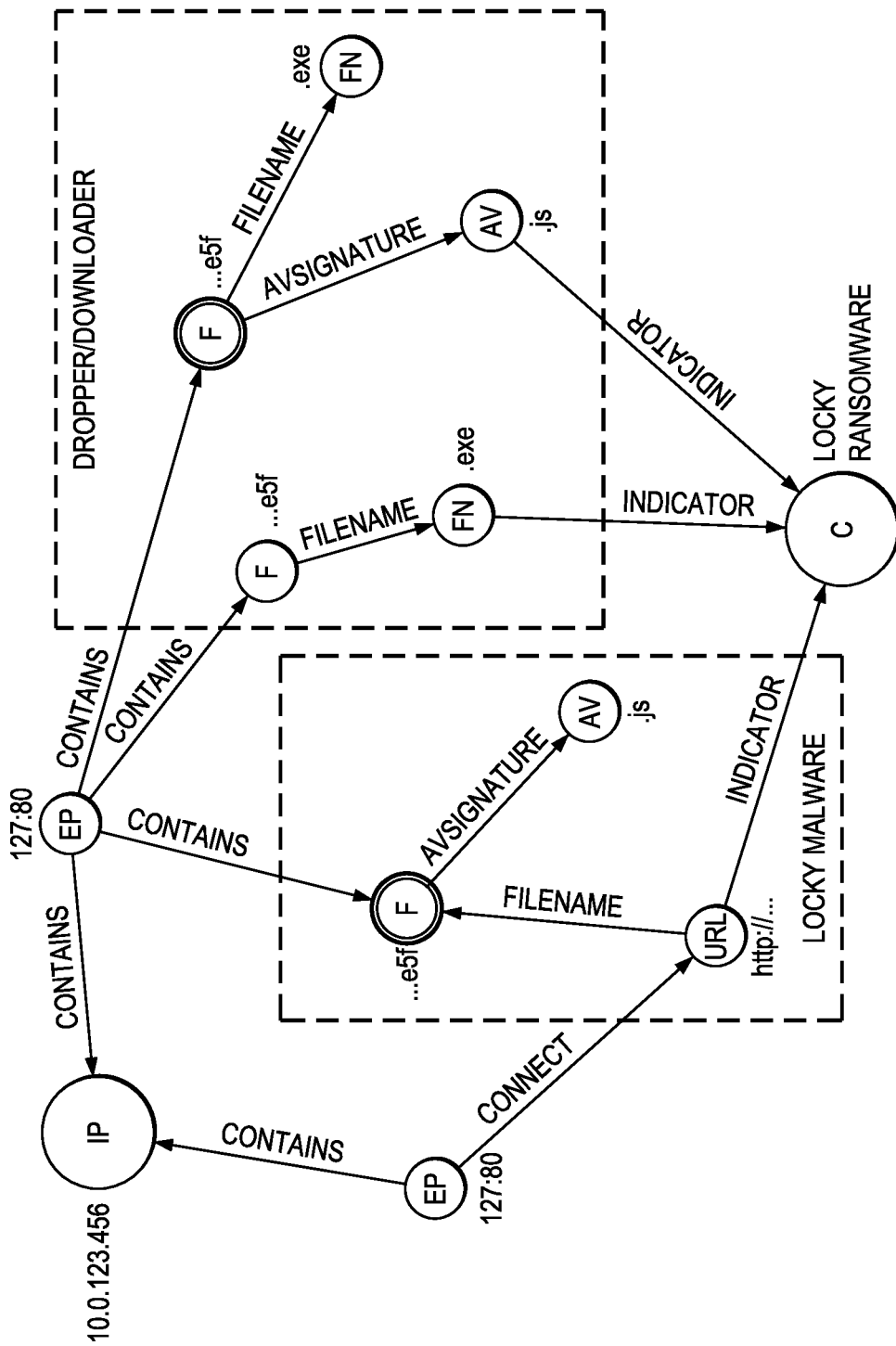
FIG. 11 depicts how a knowledge graph finding (the subgraph) is merged into the offense context graph and then scored and pruned according to the technique of this disclosure.

FIG. 7 depicts a representative example scenario and, in particular, a partial set of findings that are output from the SIEM about a potential offense (in this example, a ransomware exploit). FIG. 8 depicts a representative offense context graph that is generated from the findings. Nodes in the graph indicate observable properties of the offense events, including information such as IP addresses, domain names, URLs, malware hashes. Edges represent semantic relationships between the nodes. FIG. 9 depicts a representative offense context graph after enrichment with information from the security knowledge graph. The enrichment may add multiple additional nodes to the existing offense context graph, which are deemed to be related to the initial offense's nodes. FIG. 10 depicts a close-up view of the enriched offense graph in FIG. 9, showing the relationship types in more detail. An edge marked as "LINKS" between a file and a URL means that the file was downloaded from the URL (download URL), and an edge marked as "CONNECT" means the file made an HTTP request to URL (e.g., post-infection). FIG. 11 depicts how a KG-determined subgraph finding is merged into the offense graph and then pruned and scored to identity that several activities of this offense all relate to a single attack family.

As described above, after generating the enriched offense context graph, preferably this graph is pruned, e.g., to reduce its size to a more manageable level. The following provides additional details regarding pruning of the enriched offense context graph.

In particular, pruning can be accomplished in various ways including, without limitation, consolidating nodes that represent redundant information, removing nodes and edges that are found to be outside any path from an input node (e.g., representing an observable associated with the offense under examination) to one or more nodes that are known to be malicious, summarizing subgraphs to a higher-level abstraction, and hiding irrelevant intermediate nodes on paths. According to a particular pruning technique, a metric (e.g., weight, relevance, distance, degree, toxicity, time, or the like) is applied to one or more events associated with the offense. Then, and based on one or more rules (and categories) that indicate key features and characteristics of the offense, nodes are scored according to the metric(s), and nodes with scores below a threshold are removed. Additional information, such as network structures and connectivity, and identity of high value assets, may also be leveraged to tune the metric(s). In addition, paths between the root node and malicious nodes are determined, and nodes outside of any such paths preferably are marked for removal. Clustering of the same type of nodes (e.g., anti-virus signatures, file names, reputation, and URLs) connected to a given node is performed to summarize into a representative placeholder potentially redundant and overlapping information. In addition, subgraphs and intermediate nodes preferably are analyzed for their semantic meaning and relevance and, where appropriate, replaced by a summary node and/or removed. The result is sometimes referred to herein as a pruned offense context graph (or a pruned context graph).

As noted above, it may be desirable to explore the knowledge graph, e.g., once again to reduce its size to a more manageable level. To this end, a signal flow analysis-based exploration of security knowledge represented in the graph structure may be implemented. In this approach, "conductance" values are associated to each of a set of edges. Each node has an associated "toxicity" value representing a degree of maliciousness associated with the node. The conductance value associated with an edge is a function of at least the toxicity values of the nodes to which the edge is incident. A signal flow analysis is conducted with respect to an input node representing an observable associated with an offense. The flow analysis seeks to identify a subset of the nodes that, based on their conductance values, are reached by flow of a signal representing a threat, wherein signal flow over a path in the graph continues until a signal threshold is met. Based on the analysis, nodes within the subset are designated as hypothesis nodes for further examination. Entities that are not in the path from an input node to the hypothesis nodes preferably are pruned.

The technique of this disclosure provides significant advantages. The technique builds an enriched offense context graph that reveals potential causal relationships between security events and offenses, thereby helping the analyst comprehend an offense more thoroughly. The approach enables the analyst to prioritize which parts of the graph to be investigated first, thereby leading to faster solution. The approach provides security analysts with more comprehensive context from a variety of kinetics data imported into a SIEM system. For deep and efficient investigation, the described approach leverages a comprehensive set of rules, and it offers enriched relevant context of an offense. The approach enables efficient mining of offense context (e.g., activities, device event details, offense rules and categories, etc.) and to provide a comprehensive context graph for follow-on deep investigation and analysis.

More generally, the approach herein provides for an enhanced data mining process on security data (e.g., a cybersecurity incident) to extract contextual data related to the incident, and to translate this information into a graph representation for investigation by a security analyst. The approach, being automated, is highly efficient, and it greatly eases the workflow requirements for the SOC analyst.

The technique herein also provides for enhanced automated and intelligent investigation of a suspicious network offense so that corrective action may be taken. The nature of the corrective action is not an aspect of the described methodology, and any known or later-developed technologies and systems may be used for this purpose.

One of ordinary skill in the art will further appreciate that the technique herein automates the time-consuming and often difficult research and investigation process that has heretofore been the province of the security analyst. The approach retrieves knowledge about the IOCs using a knowledge graph preferably extracted from public and/or private structured and unstructured data sources, and then extends that knowledge even further, thereby greatly reducing the time necessary for the analyst to determine cause and effect.

The approach herein is designed to be implemented in an automated manner within or in association with a security system, such as a SIEM.

The knowledge graph may be a component of the system, or such a graph may be used by the system.

The functionality described above may be implemented as a standalone approach, e.g., a software-based function executed by a processor, or it may be available as a managed service (including as a web service via a SOAP/XML interface). The particular hardware and software implementation details described herein are merely for illustrative purposes are not meant to limit the scope of the described subject matter.

More generally, computing devices within the context of the disclosed subject matter are each a data processing system (such as shown in FIG. 2) comprising hardware and software, and these entities communicate with one another over a network, such as the Internet, an intranet, an extranet, a private network, or any other communications medium or link. The applications on the data processing system provide native support for Web and other known services and protocols including, without limitation, support for HTTP, FTP, SMTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP, FTP, SMTP and XML is available from Internet Engineering Task Force (IETF). Familiarity with these known standards and protocols is presumed.

The scheme described herein may be implemented in or in conjunction with various server-side architectures including simple n-tier architectures, web portals, federated systems, and the like. The techniques herein may be practiced in a loosely-coupled server (including a "cloud"-based) environment.

Still more generally, the subject matter described herein can take the form of an entirely hardware embodiment, an entirely software embodiment or an embodiment containing both hardware and software elements. In a preferred embodiment, the function is implemented in software, which includes but is not limited to firmware, resident software, microcode, and the like. Furthermore, as noted above, the identity context-based access control functionality can take the form of a computer program product accessible from a computer-usable or computer-readable medium providing program code for use by or in connection with a computer or any instruction execution system. For the purposes of this description, a computer-usable or computer readable medium can be any apparatus that can contain or store the program for use by or in connection with the instruction execution system, apparatus, or device. The medium can be an electronic, magnetic, optical, electromagnetic, infrared, or a semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. The computer-readable medium is a tangible item.

The computer program product may be a product having program instructions (or program code) to implement one or more of the described functions. Those instructions or code may be stored in a computer readable storage medium in a data processing system after being downloaded over a network from a remote data processing system. Or, those instructions or code may be stored in a computer readable storage medium in a server data processing system and adapted to be downloaded over a network to a remote data processing system for use in a computer readable storage medium within the remote system.

In a representative embodiment, the graph generation techniques are implemented in a special purpose computer, preferably in software executed by one or more processors. The software is maintained in one or more data stores or memories associated with the one or more processors, and the software may be implemented as one or more computer programs. Collectively, this special-purpose hardware and software comprises the functionality described above.

Further, any authentication or authorization functionality required herein may be implemented as an adjunct or extension to an existing access manager or policy management solution.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Finally, while given components of the system have been described separately, one of ordinary skill will appreciate that some of the functions may be combined or shared in given instructions, program sequences, code portions, and the like.

The techniques herein provide for improvements to another technology or technical field, namely, security incident and event management (SIEM) systems, as well as improvements to automation-based knowledge graph-based analytics.

A refined offense context graph as described herein may be rendered for visual display to the SOC analyst to facilitate the follow-on analysis.

Having described our invention, what we claim is as follows:

1. A method for processing security event data in association with a knowledge graph, comprising:
   receiving, from a security system, information representing an offense;
   building an offense context graph based in part on context data about the offense, the offense context graph comprising nodes and edges, at least one of the nodes being a node representing an entity associated with the offense, the nodes further including one or more additional nodes connected to the root node either directly or through one or more other nodes, wherein at least one additional node has data representing an observable;
   locating the observable identified from the offense context graph as also being present within the knowledge graph;
   based on the located observable and its connections being associated with one or more known malicious entities as represented in the knowledge graph, wherein at least one connection is a path from a node in the offense context graph to an additional node representing the observable that also passes through the knowledge graph, generating, from the knowledge graph, a subgraph having at least one hypothesis associated therewith; and
   merging the subgraph together with the offense context graph to generate, for further analysis, a refined offense context graph representing a potential causal relationship that led to the offense.

2. The method as described in claim 1 further including:
   querying the security system for one or more additional observables supporting the at least one hypothesis.

3. The method as described in claim 2 wherein the refined offense context graph also includes the one or more additional observables.

4. The method as described in claim 1 further including determining a type of the offense and, based at least on the identified type, identifying the context data.

5. The method as described in claim 1 further including extending the offense context graph to include additional nodes representing information that does not relate directly to the offense, wherein at least one additional node represents a device activity.

6. The method as described in claim 1 wherein generating at least one subgraph further includes pruning the knowledge graph according to at least one metric.

7. The method as described in claim 1 wherein the security system is a SIEM, and wherein the knowledge graph is derived from structured and unstructured data sources representing general knowledge about security and threat intelligence.

8. An apparatus for processing security event data in association with a knowledge graph, comprising:
a processor;
computer memory holding computer program instructions executed by the processor, the computer program instructions operative to:
receive, from a security system, information representing an offense;
build an offense context graph based in part on context data about the offense, the offense context graph comprising nodes and edges, at least one of the nodes being a node representing an entity associated with the offense, the nodes further including one or more additional nodes connected to the root node either directly or through one or more other nodes, wherein at least one additional node has data representing an observable;
locate the observable identified from the offense context graph as also being present within the knowledge graph;
based on the located observable and its and their connections being associated with one or more known malicious entities as represented in the knowledge graph, wherein at least one connection is a path from a node in the offense context graph to an additional node representing the observable that also passes through the knowledge graph, generate, from the knowledge graph, a subgraph having at least one hypothesis associated therewith; and
merge the subgraph together with the offense context graph to generate, for further analysis, a refined offense context graph representing a potential causal relationship that lead to the offense.

9. The apparatus as described in claim 8 wherein the computer program instructions are further operative to:
query the security system for one or more additional observables supporting the at least one hypothesis.

10. The apparatus as described in claim 9 wherein the refined offense context graph also includes the one or more additional observables.

11. The apparatus as described in claim 8 wherein the computer program instructions are further operative to determine a type of the offense and, based at least on the identified type, identify the context data.

12. The apparatus as described in claim 8 wherein the computer program instructions are further operative to extend the offense context graph to include additional nodes representing information that does not relate directly to the offense, wherein at least one additional node represents a device activity.

13. The apparatus as described in claim 8 wherein the computer program instructions that generate at least one subgraph are further operative to prune the knowledge graph according to at least one metric.

14. The apparatus as described in claim 8 wherein the security system is a SIEM, and wherein the knowledge graph is derived from structured and unstructured data sources representing general knowledge about security and threat intelligence.

15. A computer program product in a non-transitory computer readable medium for use in a data processing system for processing security event data in association with a knowledge graph, the computer program product holding computer program instructions that, when executed by the data processing system, are operative to:
receive, from a security system, information representing an offense;
build an offense context graph based in part on context data about the offense, the offense context graph comprising nodes and edges, at least one of the nodes being a node representing an entity associated with the offense, the nodes further including one or more additional nodes connected to the node either directly or through one or more other nodes, wherein at least one additional node has data representing an observable;
locate the observable identified from the offense context graph as also being present within the knowledge graph;
based on the located observable and its being associated with one or more known malicious entities as represented in the knowledge graph, wherein at least one connection is a path from a node in the offense context graph to an additional node representing the observable that also passes through the knowledge graph, generate, from the knowledge graph, a subgraph having at least one hypothesis associated therewith; and
merge the subgraph together with the offense context graph to generate, for further analysis, a refined offense context graph representing a potential causal relationship that lead to the offense.

16. The computer program product as described in claim 15 wherein the computer program instructions are further operative to:
query the security system for one or more additional observables supporting the at least one hypothesis.

17. The computer program product as described in claim 16 wherein the refined offense context graph also includes the one or more additional observables.

18. The computer program product as described in claim 15 wherein the computer program instructions are further operative to determine a type of the offense and, based at least on the identified type, identify the context data.

19. The computer program product as described in claim 15 wherein the computer program instructions are further operative to extend the offense context graph to include additional nodes representing information that does not relate directly to the offense, wherein at least one additional node represents a device activity.

20. The computer program product as described in claim 15 wherein the computer program instructions that generate at least one subgraph are further operative to prune the knowledge graph according to at least one metric.

21. The computer program product as described in claim 15 wherein the security system is a SIEM, and wherein the knowledge graph is derived from structured and unstructured data sources representing general knowledge about security and threat intelligence.

* * * * *